Oct. 28, 1941. C. L. A. WYND 2,260,501
METHOD OF MAKING UNIAXIAL LOW SHRINKAGE CELLULOSE DERIVATIVE SHEETING
Filed March 26, 1937
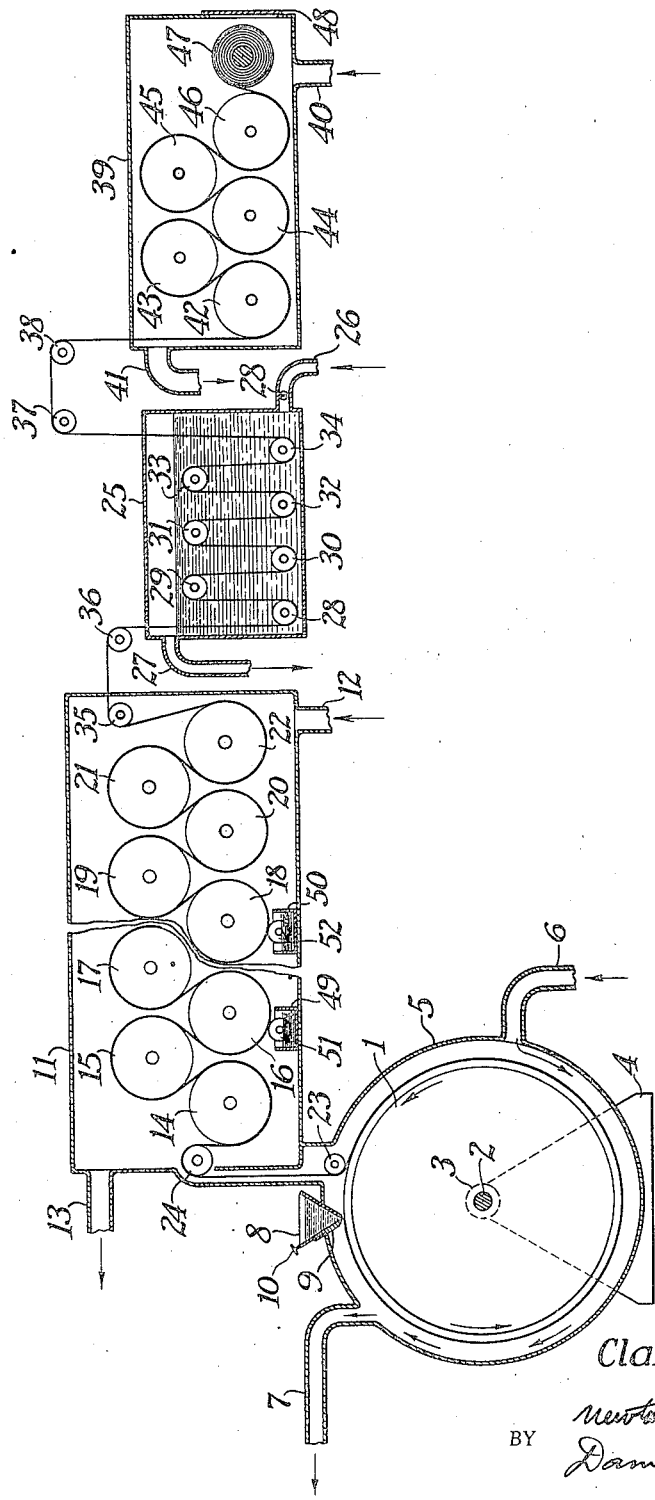
Clarence L. A. Wynd
INVENTOR.
BY
ATTORNEYS Patented Oct. 28, 1941

2,260,501

UNITED STATES PATENT OFFICE 2,260,501

METHOD OF MAKING UNIAXIAL LOW SHRINKAGE CELLULOSE DERIVATIVE SHEETING

Clarence L. A. Wynd, Rochester, N. Y., assignor to Eastman Kodak Company, Rochester, N. Y., a corporation of New Jersey Application March 26, 1937, Serial No. 133,272

7 Claims. (Cl. 18—57)

This invention relates to the manufacture of transparent cellulose derivative sheeting and more particularly to the manufacture of a type of sheeting especially adapted for use as film support in aerial photographic film and of such character that distortion of the photographic image arising from dimensional changes due to age or changing atmospheric conditions is minimized or eliminated.

In the use for aerial photography, map work, photomechanical processes and similar purposes, of photographic film comprising film support produced in accordance with standard practice, certain disadvantages have been encountered, since in such film, when exposed, processed and used under different conditions of age or relative humidity, shrinkage or swell of the base or support takes place unevenly resulting in distortion of the photographic image. The accuracy of maps based on the photographic image of such film has in many cases been found to be considerably lessened. Moreover, if topographic maps are constructed from such films, the relative accuracy of the various portions of the maps might be much different than the originals and elevations derived from them considerably in error. It will therefore be readily appreciated that even slight distortions of the photographic image due to non-uniform shrinkage of the film base is a serious matter. Heretofore efforts have been made to produce a uniaxial film, that is, a film having substantially the same lengthwise as widthwise shrinkage and swell and shrink amplitude, but until the advent of the invention herein described, this long sought result has not been attained.

This invention accordingly has as its principal object to produce a photographic base or support having uniform shrinkage characteristics, that is, a film base having substantially the same lengthwise as widthwise swell and shrink amplitude when tested or used under widely varying conditions. A further object is to provide a photographic film support having shrinkage characteristics which will enable it to be successfully used as a support in the manufacture of photographic film adapted for aerial photography. A still further object is to provide a photographic film support having a minimum of difference between it widthwise and lengthwise swell and shrink amplitude. Another object is to provide a photographic film support having a minimum of non-reversible shrinkage. Still another object is to provide a type of transparent cellulose derivative sheeting of uniform shrinkage characteristics and adapted for use in various photographic and photo-mechanical processes in which a minimum of distortion of the photographic image is obtained. Still another object is to provide a process by which such film or sheeting may be prepared. A specific object is to provide a process by which a transparent cellulose derivative film support having a predominantly uniaxial orientation of its micellar structure, that is, a uniaxial film support free, or substantially free from, micellar alignment and, therefore, displaying a minimum of difference between the lengthwise and widthwise values of either the non-reversible or the reversible shrinkage, may be produced. An additional object is to produce a film support free from residual mechanical strains which, if present, might be released during the use of the support and result in high lengthwise (non-reversible) shrinkage. Other objects will appear hereinafter.

These objects are accomplished by the following invention which is based upon the discovery that if a cellulose derivative film or sheeting is produced under such conditions that longitudinal orientation of its micellar structure is avoided, so far as possible, and any internal strains which may be set up in the structure of the film during curing, which would have a tendency toward orientation are removed, that the tendency of the film to change in dimension lengthwise will be substantially the same as its tendency to change in dimension widthwise, or, in other words, the film will have substantially the same shrinkage and swell and shrink amplitude lengthwise as widthwise under conditions of processing and thus a minimum tendency toward distortion of the photographic image when such film or sheeting is used as the base or support for a light-sensitive emulsion.

As is well-known, the standard method of producing photographic film support and similar types of sheeting is to deposit in the form of film on an appropriate film-forming surface, such as the surface of a slowly moving wheel or band, a solution of a cellulose derivative such as cellulose nitrate or cellulose acetate in appropriate solvents, to remove sufficient of the solvent to cause the film support to reach a condition in which it may be stripped from the film-forming surface and, after stripping, to cure out the residual solvent. If the support is in a soft, plastic condition, as is generally the case when it is stripped, the tension necessary to strip it and to carry it through the various steps of the curing operation will tend to elongate the support and this elongation will tend to line up the cellulose derivative miscelles lengthwise thereof. I have found that when such orientation takes place, any dimensional changes which occur in the support, whether they be due to permanent shrinkage because of loss of residual solvent or to reversible shrinkage due to loss of moisture, will be greater in the widthwise than in the lengthwise direction. The first consideration is, therefore to cure the support as thoroughly as possible before it leaves the film-forming surface, so that it may be harder and more resistant to tension, and to avoid subjecting the support to tension wherever possible during the subsequent curing, subbing or other treatment. The film as it leaves the stripping point is ordinarily conveyed to a curing chamber in which it is carried around a series of drier drums where residual solvent is reduced to as low a figure as is consistent with practical operating conditions, generally to or below 5%. It will, of course, be readily appreciated that as thorough removal of solvent as possible is important, as otherwise shrinkage due to solvent loss would occur in the support during use or processing of the finished film, with consequent distortion of the photographic image.

Assuming that the support leaves the film-forming surface in a fairly solid condition and is cured in the manner specified, that is, by being carried over a series of drier drums heated to appropriate temperatures, it will be appreciated that, as the support is snubbed around the driers, it cannot shrink lengthwise, but only in a widthwise direction, as the residual solvent is removed. The loss of this relatively small amount of solvent, however, produces in the film a tendency or desire to shrink which cannot be satisfied because the mobility of the miscelles is not great enough for them to re-arrange and align themselves in the lengthwise direction under the self-produced strain. This tendency toward alignment, due to lengthwise tension placed on the support on the driers occasioned by loss of solvent sets up in the film a strained condition. I have found that when thoroughly cured support produced in this way is subjected to the action of various processing baths or under varying conditions of humidity and temperature, it will shrink and the shrinkage will be in the lengthwise direction, this type of shrinkage being purely a mechanical shrinkage, since not accompanied by a loss of any material from the support. Naturally it is of the utmost importance that such strains be released before the support is employed as a photographic film base, since if not removed before such use the resulting film will have a tendency to change in dimension more in the lengthwise than in the widthwise direction and a serious distortion of the photographic image will take place.

In producing film in accordance with my invention, as set forth above, every precaution is taken to avoid tension on the film wherever possible. As stated, the film should be cured as thoroughly as possible while it is still on the wheel or other film-forming surface, in order to prevent to as great a degree as possible any stretching or elongation of the film during stripping or in subsequent treatment. Solvents should preferably be removed so that the film contains at stripping not over 10% residual solvent.

I have found that the condition of the coating or film-forming surface is also of considerable importance. This surface should preferably be formed of a highly polished metal, since the higher the degree of polish, the greater will be the ease of stripping and consequently the less will be the tendency to stretch or elongate the support because of the lower degree of tension or pull required to remove it.

After stripping, the support is passed over a series of drier drums heated to an appropriate temperature (definitely below the decomposition temperature of the particular cellulose derivative under consideration) where residual solvent is removed. Following this step and in order to remove the above mentioned strained condition which the material has acquired during its passage over the heated drums, in accordance with my invention it is then carried into and through a water bath, the film meeting progressively hotter water in the course of its travel. In this step the support undergoes what may be called an annealing action which releases the mechanical strains existing in the film and permits any tendency which the film may have toward lengthwise shrinkage to exert itself, thus more or less stabilizing its shrinkage characteristics.

The film is then passed over a second series of drier drums in order to remove surface moisture and moisture which may have found its way into the film during the water bath, or, as it is commonly called, "water-boxing" treatment.

In the following examples and description, I have set forth several of the preferred embodiments of my invention, but they are included merely for purposes of illustration and not as a limitation thereof.

The accompanying drawing is a schematic elevational sectional view of a conventional type of apparatus in which the herein described process may be carried out.

Referring to the drawing, the numeral 1 designates a conventional type of film-forming wheel provided with a highly polished casting surface mounted by means of shaft 2 on suitable bearings 3 carried by base 4. Wheel 1 is enclosed within air casing 5, provided with air inlet 6 and outlet 7.

Numeral 8 designates a conventional type of dope hopper for supplying a thin layer of cellulose derivative solution or dope to the surface of wheel 1, thickness of the dope stream being regulated by means of gate member 9, adjustment of which is by means of thumb screw 10, conveniently threaded through the side wall of the hopper.

Numeral 11 designates a curing chamber provided with air inlet 12 and outlet 13 and with a series of drier drums 14, 15, 16, 17, etc., each of which is provided with means (not shown) for internal heating. These drums are conveniently mounted in a series so as to convey the support undergoing curing through an extend sinuous path after leaving the film-forming surface at the stripping roll 23 and passing over guide roll 24.

Numeral 25 designates a water box provided with inlet conduit 26 and overflow or outlet conduit 27 for conveying hot water to and from the treating chamber, as shown, the flow being controlled by means of valve 28 located in conduit 26. The waterbox is also provided with a series of rolls 28, 29, 30, 31, etc., which may be driven in such manner (as, for example, the so-called tendency drive) as to place a minimum of longitudinal tension upon the support. The support passes after leaving the last roll 22 of the curing chamber 11 over guide rolls 35 and 36 and thence into the waterbox. Numerals 37 and 38 designate another set of guide rolls over which the support passes after emerging from the waterbox 25 on its way to the final stage of curing.

Numeral 39 designates a final curing chamber, provided with air inlet conduit 40 and outlet conduit 41, and containing a series of drier drums 42, 43, 44, etc., similar to those of chamber 11, over which the film passes as shown, finally arriving at the windup 47, at which point the finished support may be removed by means of the door 48.

Referring to curing chamber 11, numerals 49 and 50 designate sub-hoppers of conventional design for application to the film support of subs, backings or other layers as may be required. These hoppers may each be provided with a suitably mounted rotatable applicator roll or rolls such as 51 and 52 for conveying a bead or portion of the subbing or other solutions into contact with the support. It is important to note that, in accordance with my invention and in order to preclude, insofar as possible, softening the support at points where it would have a tendency to stretch or elongate (and hence set up the above-mentioned condition of micellar orientation with its resulting non uniformity of shrinkage), the sub hoppers are placed underneath the selected drier drums, as shown, in such manner as to apply the subbing solution at a point and at a time when the support is under substantially no tension or at least under a minimum tension, as is the case when it is lying flat against the drum and adhering thereto.

My invention will be more fully understood by reference to several specific examples.

*Example I.*—A solution of cellulose nitrate is made up as follows: 100 parts by weight of cellulose nitrate having a nitrogen content of 12.15%, 10 parts by weight of camphor, and 40 parts by weight of butyl alcohol are dissolved in 390 parts of a solvent made up of 88% by weight methyl alcohol and 12% by weight of acetone. After solution has been completed in a mechanical mixer, the resulting dope is filtered and allowed to stand until free from bubbles. It is then placed in the hopper of a roll coating machine such as that illustrated in the drawing and permitted to flow therefrom in a thin layer onto the surface of the slowly rotating coating wheel. The coating wheel is maintained at an approximate temperature, say of about 104° F. and as the wheel rotates in the direction indicated by the arrows, solvents are removed under the influence of the current of heated air which circulates through the wheel casing.

The deposited sheet or film is cured on the wheel to as great an extent as possible, that is, to as great an extent as is consistent with stripping of the material in a usable form. The solvent is thereby reduced to not over 15% and preferably to or below 10% in order that the film should be as hard and resistant to elongation as possible, under the influence of the tension required to strip it and to carry it through the subsequent curing and water boxing operations.

In accordance with the invention, every precaution is taken to subject the film at stripping to as little longitudinal tension as is possible. Preferably, the wheel surface is polished as highly as possible and various expedients are employed to facilitate ease of stripping. It will be readily appreciated that a cellulose derivative sheet or film can be much more readily removed from a highly polished surface than one which has a scratched, toothed or uneven surface; hence, such surface irregularities tend to cause the film to cling tenaciously thereto. To further facilitate ready stripping, the wheel surface may be dusted with chalk dust, talc, or similar materials prior to deposition of the film-forming solution. Provision may also be made to facilitate easy removal by applying a bead off water in the V-shaped opening between the film and the coating surface at the stripping point, as described and claimed in the patent to Carroll, 2,119,702. Still another method of accomplishing the same result is to apply a pad or cloth kept saturated with water to the outer surface of the sheet just before it is stripped. While the mechanism of the action of water under these circumstances is not fully understood, it is my belief that it tends to swell the sheet or film and break it loose from its bond with the coating surface.

After leaving the film-forming surface, the sheet of film support is passed over internally heated drier drums having a surface temperature of about 220° F. A curing device or drier section embodying such a series of drums and the manner of handling the support therein is illustrated in the drawing. Air heated to a temperature of 140°–240° F. is supplied to the drier section. If desired, a plurality of such drier sections may be employed.

In accordance with my invention and as a very important means of preventing softening and consequent stretching or elongation of the support, any subbing or backing treatments are applied in the curing section and while the film is passing over the driers. Preferably such subbing or other applications are made from sub hoppers mounted underneath the drier drums, the subbing or backing liquid being thus applied to the support while it is under substantially no tension. Inasmuch as layers of treating liquid of only superficial thickness are deposited, the support is not appreciably softened and the solvents contained therein have an opportunity to evaporate before the support reaches any point where it is subjected to any considerable tension.

It is inevitable, however, that the mere fact of the film being snubbed around a series of dryer drums and thus unable to shrink lengthwise that the above mentioned mechanical strains are set up in the material. The support after leaving the dryers is, therefore, conducted through a water box such as shown in the drawing, the support at this point having a residual solvent content of 5% or less. The support is conducted through water in the water box, the water being heated at the inlet to a temperature of about 210° F., and leaving the water box with an outlet temperature of about 170° F. The support is led into the water box near the outlet end and emerges therefrom near the inlet end and thus meeting a countercurrent flow of water of progressively increasing temperature as it moves therethrough.

During this water boxing treatment the above-mentioned mechanical strains are eliminated and, since the majority of the residual solvent has already been removed from the material before it reaches the water box, the support emerges therefrom in a condition in which its shrinkage characteristics have been stabilized. The support is then passed over another series of dryer drums to remove surface moisture and moisture which may have penetrated into the film during the water boxing step.

Upon subjecting three different samples of the support produced without the water boxing step to the shrinkage test, hereinafter more particularly described, it was found that the difference in shrinkage lengthwise and widthwise were .22%, .30%, and .29%, respectively. Compared to this, with a support produced in accordance with the procedure just described in which the material was water boxed, it was found that the differences between lengthwise and widthwise shrinkage were reduced respectively to .12%, .12% and .08%.

*Example II.*—A solution of cellulose acetate propionate prepared as described in U. S. Patent 1,800,860 is prepared by mixing 100 parts by weight of the cellulose acetate propionate and 25 parts by weight of triphenylphosphate and 500 parts by weight of ethylene dichloride. After solution has been completed the dope is filtered and allowed to stand until free from bubbles. It is then heated to a temperature of about 110–125° F. and subjected to the same procedure as described in Example I. The product thus obtained is also characterized by an extremely low swell and shrink amplitude.

As illustrating the outstanding results obtained by the practice of my process, the following tabulation of comparative tests made on film support produced according to standard practice and the same type of material produced in accordance with my invention, is given.

TABLE I

*Waterbath shrinkage*

|  |  | A | B |
|---|---|---|---|
|  |  | Percent | Percent |
| Cellulose nitrate (standard practice). | Length [1] | .52 | .47 |
|  | Width [1] | .48 | .41 |
| Cellulose nitrate (improved process). | Length [1] | .00 | .00 |
|  | Width [1] | .00 | .00 |
| Cellulose acetate propionate (standard practice). | Length [1] | .77 | .86 |
|  | Width [1] | .45 | .52 |
| Cellulose acetate propionate (improved process). | Length [1] | .10 | .13 |
|  | Width [1] | .03 | .03 |

[1] Percentage of dimensional change.

TABLE II

*Swell and shrink amplitude of topographic aero film*

|  |  | A | B |
|---|---|---|---|
|  |  | Percent | Percent |
| Cellulose nitrate (improved process). | Length | .62 | .67 |
|  | Width | .64 | .69 |
|  | Difference [1] | .02 | .02 |
| Cellulose nitrate (standard practice). | Length | .46 | .52 |
|  | Width | .70 | .73 |
|  | Difference [1] | .24 | .20 |
| Cellulose acetate propionate (improved process). | Length | .55 | .55 |
|  | Width | .57 | .58 |
|  | Difference [1] | .02 | .02 |
| Cellulose acetate propionate (standard practice). | Length | .49 | .56 |
|  | Width | .56 | .64 |
|  | Difference [1] | .07 | .08 |

[1] Difference in swell and shrink amplitude is measure of micellar alignment.

It will thus be seen from the above tabulation that a very marked and unexpected improvement in the swell and shrink amplitude uniformity of film support takes place when such support is manufactured in accordance with our invention and that the annealing step and other conditions of the process provide a method of producing a type of film support which is well-adapted for use in the manufacture of topographic aero film, for photo-mechanical processes and for other products in which the lowest possible degree of image distortion is desired.

It will be useful at this point to illustrate the shrinkage tests by which the figures in the above tabulation were obtained. It should be pointed out that, in order to determine the shrinkage characteristics of a cellulose derivative film support the material should be subjected to tests which measure different shrinkage characteristics, namely, shrinkage due to loss of solvent (an irreversible shrinkage), and the swell and shrink amplitude (a purely reversible change in dimensions due to characteristic hygroscopicity of the particular cellulose derivative structure of the support). An ideal film support, so far as this test is concerned, would be one in which the lengthwise and widthwise shrinkage and swell and shrink amplitude were the same, that is, one in which the difference between the lengthwise and widthwise shrinkage or swell and shrink amplitude were zero.

It will accordingly be readily appreciated that a film support produced in accordance with the instant invention and having been subjected to the annealing treatment in a water box during manufacture should show a minimum or complete absence of shrinkage under the water bath shrinkage test, because of the solvent extracting effect of the water during the water box treatment. That film support produced in accordance with the invention actually reaches this condition is indicated by the comparative films shown in Table I above.

The actual tests are carried out as follows:

*Water bath shrinkage test*

All film support, whether bearing an emulsion or not, is conditioned and measured both before and after processing in a constant humidity room at a relative humidity of 50% or as close thereto as is possible, and at a dry bulb thermometer reading of 70° F. For film support of cine-positive thickness (.0055 inch) or less, the time of conditioning before processing should be not less than 1¼ hours; after processing not less than 2¼ hours. Film support of greater than cine-positive thickness should be conditioned at least 2¼ hours before processing and 3–5 hours after processing.

An emulsion coated support should be conditioned for at least 2½ hours both before and after processing.

To carry out the water bath shrinkage test, strips 15 inches long 1½ inches wide are cut from the support. Usually two strips from each sample lengthwise of the support and two strips widthwise are used for the test and two sets of perforations are made in each strip. These strips are perforated on a punch and die perforating machine, the holes being approximately 10 inches apart. Measurements from outside edge to outside edge of the perforation holes are taken. Thus a reading, if immediately taken, should be zero on the gauge. The gauge employed is graduated in thousandths of an inch and since the perforations are 10 inches apart the percentage of dimensional change may be read directly from the gauge by merely moving the decimal point one place to the right.

The strips are conditioned at 50% relative humidity and then measured. They are then tacked loosely on a wooden rack and placed in a constant temperature thermostatically controlled water bath at 100° F. and left for 17 hours. The samples are then wiped to remove excess moisture and reconditioned at 50% relative humidity and then measured again and the dimensioned change computed. As indicated above, this test measures the irreversible shrinkage, if any, due to loss of solvent from the support and also that due to the release of mechanical strains.

*Swell and shrink amplitude*

Samples of the same dimensions as employed for the water bath shrinkage test are conditioned as above and put through the regular water bath shrinkage test. The procedure is then as follows:

The samples are placed in a water bath at 125° F. for 30 minutes, spacing them in and out a minute or so apart to allow time for measuring. Care is taken to measure as speedily as possible after the removal from the water after giving them a quick wipe with a towel to remove surplus water as shrinkage takes place almost instantly. The sample is then placed in an oven at 125° F. for one hour, then taken out and measured. This cycle is repeated three times or until the difference between the wet and dry readings becomes constant. The difference between the last wet and dry readings in percentage is the per cent swell and shrink amplitude. As before stated, this test measures the permanent characteristic tendency of the support to swell and shrink under the influence of absorbed and desorbed moisture, the difference between the lengthwise and widthwise measurements representing the amount of non-uniformity in the structure lengthwise and widthwise.

It will, of course, be evident that the steps and conditions of operation of my process may be rather widely varied within the scope of the invention. For example, the coating and curing temperatures may vary rather widely, depending upon the particular dope composition, the solvents used therein, the speed of film formation and other factors. In general, I prefer to use coating temperatures of 90° F. to 130° F.

Likewise, the curing temperatures may vary, although I prefer to use temperatures within the range of 150° F. to 250° F. As previously indicated, I may employ a plurality of stages of curing the film support prior to the annealing or water boxing step.

With respect to the annealing or water boxing step, I prefer to employ water heated as near to the boiling point (212° F.) as possible, although lower temperatures may be employed under some circumstances. In the case of cellulose acetate propionate I prefer to employ a temperature not over about 165° F. The length of the path through which the support travels may be adjusted to provide for an immersion time of approximately 30-60 minutes. With temperatures much below the boiling point, it will generally be desirable to immerse the support for a somewhat longer period.

As in the case of the preliminary curing of the support, the water boxing procedure may be carried out in a plurality of steps, if desired. In some cases it may be desirable to employ a series of water boxes, each of which has a progressively higher range of temperatures than the one preceding. Various other modifications of the water boxing step may be made within the scope of my invention.

While I have found it convenient to illustrate my process by reference to the manufacture of cellulose nitrate and cellulose acetate propionate support, my invention is broadly applicable to the production of support from many other cellulose derivatives, such as the single and mixed organic acid esters of cellulose typified by cellulose acetate, cellulose propionate, cellulose butyrate, cellulose acetate propionate, cellulose acetate butyrate, and others.

One point which should be emphasized in connection with the invention is the purpose of the water boxing step. As previously set forth, this phase of the process is carried out fundamentally for the purpose of releasing any internal strains which have been set up in the material, due to the effects of tension. This treatment is not carried out for the purpose of solvent extraction, as in the case with certain processes of the prior art, for example, that disclosed in the U. S. patent to Carver 2,037,704, although small amounts of residual solvent which may remain in the support, will be incidentally removed in the water boxing step.

I claim:

1. The method of making a cellulose derivative sheet or film adapted for use as support for aero and similar types of photographic film and having substantially no tendency toward irreversible shrinkage and substantially the same lengthwise as widthwise swell and shrink amplitude, which comprises depositing a solution of a cellulose derivative in a volatile solvent in the form of a film on a film-forming surface which has such a degree of smoothness or polish as will permit stripping of the film therefrom without appreciable stretching while the film contains not over about 10% residual solvent, removing solvent until the film contains not over about 10% residual solvent, thereupon stripping the film from the film-forming surface under a tension less than that which causes appreciable stretching of the film and orientation of the micelles thereof, reducing the remaining residual solvent to a value corresponding to not over about 5% while the film is under a tension insufficient to stretch the film material and orient the micelles thereof, and thereafter releasing any residual internal mechanical strains which may have unavoidably accumulated in the film through handling incident to stripping and curing, by subjecting the film to a hot water annealing treatment while maintained under substantially no tension or at least a tension insufficient to elongate the film and orient the micelles thereof.

2. The method of claim 1 in which the annealing treatment consists in immersion of the film in water having a temperature of 150-212° F.

3. A uniaxial, cellulose derivative sheet or film adapted for use as the support in aero and similar types of photographic film, having substantially no tendency toward irreversible shrinkage and substantially the same lengthwise as widthwise swell and shrink amplitude, which sheet has been produced by depositing a solution of a cellulose derivative in a volatile solvent in the form of a film on a film-forming surface which has such a degree of smoothness or polish as will permit stripping of the film therefrom without apover about 10% residual solvent, removing solvent until the film contains not over about 10% residual solvent, thereupon stripping the film from the film-forming surface under a tension less than that which causes appreciable stretching of the film and orientation of the micelles thereof, reducing the remaining residual solvent to a value corresponding to not over about 5% while the film is under a tension insufficient to stretch the film material and orient the micelles thereof, and thereafter releasing any residual internal mechanical strains which may have unavoidably accumulated in the film through handling incident to stripping and curing, by subjecting the film to a hot water annealing treatment while maintained under substantially no tension or at least a tension insufficient to elongate the film and orient the micelles thereof.

4. The product of claim 3 in which the sheet or film is composed of cellulose nitrate.

5. The product of claim 3 in which the sheet or film is composed of a cellulose organic acid ester.

6. The product of claim 3 in which the sheet or film is composed of a mixed cellulose organic acid ester.

7. The product of claim 3 in which the sheet or film is composed of cellulose acetate propionate.

CLARENCE L. A. WYND.